United States Patent
Burns et al.

(10) Patent No.: US 10,538,680 B2
(45) Date of Patent: Jan. 21, 2020

(54) PRINTING INK

(71) Applicant: Sericol Limited, Broadstairs Kent (GB)

(72) Inventors: Kevin Burns, Broadstairs Kent (GB); Carole Noutary, Broadstairs Kent (GB); Scott Biggs, Broadstairs Kent (GB)

(73) Assignee: Sericol Limited, Broadstairs Kent (GB)

( * ) Notice: Subject to any disclaimer, the term of this patent is extended or adjusted under 35 U.S.C. 154(b) by 0 days.

(21) Appl. No.: 14/904,000

(22) PCT Filed: Jul. 14, 2014

(86) PCT No.: PCT/GB2014/052151
§ 371 (c)(1),
(2) Date: Jan. 8, 2016

(87) PCT Pub. No.: WO2015/004489
PCT Pub. Date: Jan. 15, 2015

(65) Prior Publication Data
US 2016/0160064 A1    Jun. 9, 2016

(30) Foreign Application Priority Data

Jul. 12, 2013 (GB) .................................. 1312488.8
Oct. 2, 2013 (GB) .................................. 1317474.3

(51) Int. Cl.
| C09D 11/107 | (2014.01) |
|---|---|
| C09D 11/322 | (2014.01) |
| C09D 11/101 | (2014.01) |
| C09D 11/30 | (2014.01) |

(52) U.S. Cl.
CPC .......... *C09D 11/107* (2013.01); *C09D 11/101* (2013.01); *C09D 11/30* (2013.01); *C09D 11/322* (2013.01)

(58) Field of Classification Search
CPC ............................... C09D 11/30; C09D 11/00
See application file for complete search history.

(56) References Cited

U.S. PATENT DOCUMENTS

| 7,368,485 B2 * | 5/2008 | Noutary | C09D 11/101 522/181 |
|---|---|---|---|
| 2007/0257976 A1 | 11/2007 | Takabayashi | |
| 2008/0000384 A1 * | 1/2008 | Belelie | C09D 11/101 106/31.13 |
| 2009/0326091 A1 * | 12/2009 | Loccufier | C08F 2/50 522/26 |
| 2010/0047454 A1 * | 2/2010 | De Voeght | B41J 2/211 427/256 |
| 2010/0239777 A1 * | 9/2010 | Nakajima | C09D 11/101 427/508 |
| 2010/0313782 A1 * | 12/2010 | Loccufier | C09D 11/101 101/483 |

FOREIGN PATENT DOCUMENTS

| EP | 2 228 415 A1 | 9/2010 |
|---|---|---|
| GB | 2 371 551 A | 7/2002 |
| JP | 2004526820 A | 9/2004 |
| JP | 2008-214395 A | 9/2008 |
| JP | 2011-500932 A | 1/2011 |
| JP | 2013 107374 A | 6/2013 |
| WO | 02/061001 A1 | 8/2002 |
| WO | 2006/061979 A1 | 6/2006 |
| WO | 2009/053348 A1 | 4/2009 |
| WO | 2012/153867 A1 | 11/2012 |
| WO | 2012/172973 A1 | 12/2012 |
| WO | 2013/069580 A1 | 5/2013 |

OTHER PUBLICATIONS

International Search Report for corresponding PCT Application No. PCT/GB2014/052151 dated Jan. 10, 2014.

* cited by examiner

*Primary Examiner* — Scott R. Walshon
*Assistant Examiner* — Sathavaram I Reddy
(74) *Attorney, Agent, or Firm* — Wood, Phillips, Katz, Clark & Mortimer

(57) ABSTRACT

This invention provides an inkjet ink comprising: an $\alpha,\beta$-unsaturated ether monomer in which the only radiation-curable functional groups present in the monomer are $\alpha,\beta$-unsaturated ether groups; a tri- or higher functionality (meth)acrylate monomer in which the only radiation-curable functional groups present in the monomer are acrylate groups; and a colouring agent; wherein the ink contains less than 5% by weight of water and volatile organic solvents in total, and less than 10% by weight of mono-and di-functional monomers in total, other than the $\alpha,\beta$-unsaturated ether monomer, where the amounts by weight are based on the total weight of the ink, and wherein the ink has a viscosity of less than 100 mPas at 25° C. The ink is particularly suitable for printing onto food packaging.

6 Claims, No Drawings

// PRINTING INK

FIELD OF THE INVENTION

The present invention relates to a printing ink and in particular to an inkjet ink for printing onto food packaging.

BACKGROUND OF THE INVENTION

Inkjet printing is an attractive technique for printing onto a wide-range of substrates on account of its flexibility and ease of use. However, food packaging represents a particular challenge on account of the strict limitations on the properties of materials which come into contact with food, including indirect additives like packaging inks. Specific exclusions include volatile organic solvents and many monomers typically used in inkjet inks based on their odour and/or migration properties.

There is therefore a need in the art for inkjet inks which can be printed directly onto food packaging, without compromising the printing and drying/curing properties of the ink.

BRIEF SUMMARY OF THE INVENTION

Accordingly, the present invention provides an inkjet ink comprising:
an α,β-unsaturated ether monomer in which the only radiation-curable functional groups present in the monomer are α,β-unsaturated ether groups;
a tri- or higher functionality (meth)acrylate monomer in which the only radiation-curable functional groups present in the monomer are acrylate groups; and
a colouring agent;
wherein the ink contains less than 5% by weight of water and volatile organic solvents in total, and less than 10% by weight of mono- and di-functional monomers in total, other than the α,β-unsaturated ether monomer, where the amounts by weight are based on the total weight of the ink, and wherein the ink has a viscosity of less than 100 mPas at 25° C.

Thus, the present invention provides an ink which has low odour and low migration and so is suitable for food packaging applications, but has a suitably low viscosity for inkjet printing and cures to provide a flexible and resilient film.

DETAILED DESCRIPTION OF THE INVENTION

The ink contains at least one α,β-unsaturated ether monomer, typically a vinyl ether. Such components are known in the art. They include at least one α,β-unsaturated ether functional group which can undergo polymerisation during the curing process. In the α,β-unsaturated ether monomer, the only radiation-curable functional groups present in the monomer are α,β-unsaturated ether groups. By "radiation-curable" is meant that the material polymerises or crosslinks when exposed to actinic radiation, commonly ultraviolet light, in the presence of a photoinitiator. These monomers provide the necessary low odour and low migration properties for indirect food packaging applications.

α,β-Unsaturated ether monomers can polymerise by free-radical or cationic polymerisation. Examples include vinyl ethers such as triethylene glycol divinyl ether, diethylene glycol divinyl ether, 1,4-cyclohexanedimethanol divinyl ether and ethylene glycol monovinyl ether. Mixtures of α,β-unsaturated ether monomers may be used.

The α,β-unsaturated ether monomer preferably has a functionality of 1 to 6, more preferably 2 to 4.

The α,β-unsaturated ether monomer is preferably present at 10-50% by weight, more preferably 20-40% by weight.

The ink also contains at least one tri- or higher functionality (meth)acrylate monomer. Such components are known in the art. They include at least three acrylate functional group which can undergo polymerisation during the curing process. In the tri- or higher functionality (meth)acrylate monomer, the only radiation-curable functional groups present in the monomer are acrylate groups. The term "radiation-curable" has the same meaning throughout as described hereinabove. Again, these monomers provide the necessary low odour and low migration properties for indirect food packaging applications.

Suitable tri- or higher functionality (meth)acrylate monomers include acrylates such as trimethylolpropane triacrylate, pentaerythritol triacrylate, tri(propylene glycol) triacrylate, bis(pentaerythritol) hexaacrylate, ethoxylated trimethylolpropane triacrylate, and mixtures thereof. Suitable (meth)acrylate monomers also include esters of methacrylic acid (i.e. methacrylates), such as trimethylolpropane trimethacrylate. Mixtures of (meth)acrylates may also be used.

The tri- or higher functionality (meth)acrylate monomer preferably has a functionality of 3 to 6.

The term "(meth)acrylate" is intended herein to have its standard meaning, i.e. acrylate and/or methacrylate.

The tri- or higher functionality (meth)acrylate monomer is preferably present at 30-80% by weight, more preferably 50-70% by weight.

The monomers used in the present invention typically have a molecular weight of less than 600, more preferably less than 400.

The combination of the above-described α,β-unsaturated ether monomer and (meth)acrylate monomer obviates the need for many other components commonly required for proper printing and curing properties. Thus, the ink of the present invention contains less than 10% by weight of mono-and di-functional monomers in total, other than the α,β-unsaturated ether monomer. That is, apart from the α,β-unsaturated ether monomer defined hereinabove, the total quantity of mono- and di-functional monomers is less than 10% by weight. The terms "monofunctional" and "difunctional" have their standard meanings, namely one or two radiation-curable functional groups, respectively, which can take part in the polymerisation or crosslinking reaction when the ink is exposed to actinic radiation, commonly ultraviolet light, in the presence of a photoinitiator. Preferably the ink contains less than 5% by weight, more preferably less than 3%, of mono- and di-functional monomers in total, other than the α,β-unsaturated ether monomer.

Non-limiting examples of mono- and di-functional monomers whose presence is to be minimised are as follows: monofunctional (meth)acrylate monomers such as phenoxyethyl acrylate (PEA), cyclic TMP formal acrylate (CTFA), isobornyl acrylate (IBOA), tetrahydrofurfuryl acrylate (THFA), 2-(2-ethoxyethoxy)ethyl acrylate, octadecyl acrylate (ODA), tridecyl acrylate (TDA), isodecyl acrylate (IDA) and lauryl acrylate; difunctional (meth)acrylate monomers such as hexanediol diacrylate, polyethylene glycol diacrylate (for example tetraethylene glycol diacrylate), dipropylene glycol diacrylate, neopentyl glycol diacrylate, propoxylated neopentyl glycol diacrylate, hexanediol dimethacrylate, triethyleneglycol dimethacrylate, diethyleneglycol dimethacrylate, ethyleneglycol dimethacrylate and 1,4-butanediol dimethacrylate; and N-vinyl amides and N-(meth)acryloyl amines such as N-vinyl caprolactam (NVC), N-vinyl pyrrolidone (NVP) and N-acryloylmorpholine (ACMO).

The ink may contain radiation-curable oligomers. Oligomers typically have a molecular weight of 400 to 7,000, more preferably the lower limit is 600 and more preferably the upper limit is 5,000. Molecular weights (number average) can be calculated if the structure of the oligomer is known or molecular weights can be measured using gel permeation chromatography using polystyrene standards. However, the ink preferably contains less than 10% by weight, more preferably less than 5% by weight and most preferably less than 3%, of radiation-curable oligomers.

The ink may also contain a passive (or "inert") thermoplastic resin. Passive resins are resins which do not enter into the curing process, i.e. the resin is free of functional groups which polymerise under the curing conditions to which the ink is exposed. In other words, the resin is not a radiation-curable material. The resin may be selected from epoxy, polyester, vinyl, ketone, nitrocellulose, phenoxy or acrylate resins, or a mixture thereof and is preferably a poly(methyl (meth)acrylate) resin. The resin has a weight-average molecular weight of 1,500-200,000, as determined by GPC with polystyrene standards as previously described hereinabove. However, the ink preferably contains less than 10% by weight, more preferably less than 5% by weight and most preferably less than 3%, of passive (or "inert") thermoplastic resin.

The ink also contains less than 5% by weight of water and volatile organic solvents in total, and more preferably less than 3%. Some water will typically be absorbed by the ink from the air and solvents may be present as impurities in the components of the inks, but such low levels are tolerated. The essential absence of water and volatile organic solvents means that the ink does not need to be dried to remove the water/solvent. It also avoids organic solvents which are unsuitable for food packaging applications. However, water and volatile organic solvents have a significant viscosity-lowering effect making formulation of the ink in the absence of such components significantly more challenging.

The coloured inks comprise at least one colouring agent. The colouring agent may be either dissolved or dispersed in the liquid medium of the ink. Preferably the colouring agent is a dispersible pigment, of the types known in the art and commercially available such as under the trade-names Paliotol (available from BASF plc), Cinquasia, Irgalite (both available from Ciba Speciality Chemicals) and Hostaperm (available from Clariant UK). The pigment may be of any desired colour such as, for example, Pigment Yellow 13, Pigment Yellow 83, Pigment Red 9, Pigment Red 184, Pigment Blue 15:3, Pigment Green 7, Pigment Violet 19, Pigment Black 7. Especially useful are black and the colours required for trichromatic process printing. Mixtures of pigments may be used.

In one aspect the following pigments are preferred. Cyan: phthalocyanine pigments such as Phthalocyanine blue 15.4. Yellow: azo pigments such as Pigment yellow 120, Pigment yellow 151 and Pigment yellow 155. Magenta: quinacridone pigments, such as Pigment violet 19 or mixed crystal quinacridones such as Cromophtal Jet magenta 2BC and Cinquasia RT-355D. Black: carbon black pigments such as Pigment black 7.

Pigment particles dispersed in the ink should be sufficiently small to allow the ink to pass through an inkjet nozzle, typically having a particle size less than 8 μm, preferably less than 5 μm, more preferably less than 1 μm and particularly preferably less than 0.5 μm.

The colorant is preferably present in an amount of 20% by weight or less, preferably 10% by weight or less, more preferably 8% by weight or less and most preferably 2 to 5% by weight. A higher concentration of pigment may be required for white inks, however, for example up to and including 30% by weight, or 25% by weight.

The inks may be in the form of an ink set comprising a cyan ink, a magenta ink, a yellow ink and a black ink (a so-called trichromatic set). The inks in a trichromatic set can be used to produce a wide range of colours and tones. Other inkjet ink sets may also be used, such as CMYK+white.

The inkjet ink exhibits a desirable low viscosity (100 mPas or less, preferably 50 mPas or less, more preferably 35 mPas or less at 25° C. and most preferably 30 mPas or less at 25° C.).

The ink may cure by free-radical polymerisation, cationic polymerisation or a combination (hybrid) of the two. Preferably it cures by free-radical polymerisation.

To achieve the cure, the ink includes one or more photoinitiators, a free-radical and/or a cationic photoinitiator, as appropriate.

The free-radical photoinitiator can be selected from any of those known in the art. For example, benzophenone, 1-hydroxycyclohexyl phenyl ketone, 1-[4-(2-hydroxyethoxy)-phenyl]-2-hydroxy-2-methyl-1-propane-1-one, 2-benzyl-2-dimethylamino-(4-morpholinophenyl)butan-1-one,
isopropyl thioxanthone, benzil dimethylketal, bis(2,6-dimethylbenzoyl)-2,4,4-trimethylpentylphosphine oxide or mixtures thereof. Such photoinitiators are known and commercially available such as, for example, under the trade names Irgacure and Darocur (from Ciba) and Lucerin (from BASF).

In a preferred embodiment of the invention, the free-radical photoinitiator is a photoinitiator package comprising two or more free-radical photoinitiators. Preferably, the photoinitiator package comprises a phosphine oxide type photoinitiator and a hydroxy ketone type photoinitiator. More preferably, the photoinitiator package comprises a blend of a bis acyl phosphine oxide photoinitiator and an alpha hydroxy ketone photoinitiator. Most preferred photoinitiator package comprises a bis acyl phosphine oxide, a monofunctional alpha hydroxy ketone and a difunctional alpha hydroxy ketone.

In the case of a cationically curable system, any suitable cationic initiator can be used, for example sulfonium or iodonium based systems. Non limiting examples include: Rhodorsil PI 2074 from Rhodia; MC AA, MC BB, MC CC, MC CC PF, MC SD from Siber Hegner; UV9380c from Alfa Chemicals; Uvacure 1590 from UCB Chemicals; and Esacure 1064 from Lamberti spa.

Preferably the photoinitiator is present in an amount of 1 to 20% by weight, preferably 4 to 10% by weight based on the total weight of the ink. In a preferred embodiment, the photoinitiator package comprises bis acyl phosphine oxide, a monofunctional alpha hydroxy ketone and a difunctional alpha hydroxy ketone in a ratio of 3 to 5 parts by weight bis acyl phosphine oxide:2 to 4 parts by weight monofunctional alpha hydroxy ketone:2.4 to 4.5 parts by weight difunctional alpha hydroxy ketone. More preferably, the photoinitiator package comprises bis acyl phosphine oxide, a monofunctional alpha hydroxy ketone and a difunctional alpha hydroxy ketone in a ratio of 4 parts by weight bis acyl phosphine oxide:3 parts by weight monofunctional alpha hydroxy ketone:3.5 parts by weight difunctional alpha hydroxy ketone.

The amounts by weight provided herein are based on the total weight of the ink, unless context indicates otherwise.

Other components of types known in the art may be present in the ink to improve the properties or performance. These components may be, for example, surfactants, defoamers, dispersants, synergists for the photoinitiator, stabilisers against deterioration by heat or light, reodorants, flow or slip aids, biocides and identifying tracers.

The ink may be prepared by known methods such as stirring with a high-speed water-cooled stirrer, or milling on a horizontal bead-mill.

The printing is performed by inkjet printing, e.g. on a single-pass inkjet printer, for example for printing (directly) onto packaging, such as food packaging. The inks are exposed to actinic (often UV) radiation to cure the ink. The exposure to actinic radiation may be performed in an inert atmosphere, using a gas such as nitrogen, in order to assist curing of the ink.

Accordingly, the present invention further provides a method of inkjet printing comprising inkjet printing the inkjet ink as defined herein onto a substrate and curing the ink.

The present invention also provides a cartridge containing the inkjet ink as defined herein. It also provides a printed substrate having the ink as defined herein printed thereon. Suitable substrates are food packaging. Food packaging is typically formed of flexible and rigid plastics (e.g. food-grade polystyrene and PE/PP films), paper and board (e.g. corrugated board).

Any of the sources of actinic radiation discussed herein may be used for the irradiation of the inkjet ink. A suitable dose would be greater than 200 mJ/cm$^2$, more preferably at least 300 mJ/cm$^2$ and most preferably at least 500 mJ/cm$^2$. The upper limit is less relevant and will be limited only by the commercial factor that more powerful radiation sources increase cost. A typical upper limit would be 5 J/cm$^2$. Further details of the printing and curing process are provided in WO 2012/110815.

The invention will now be described with reference to the following examples, which are not intended to be limiting.

EXAMPLES

Example 1

Inks, as detailed in Table 1, were prepared by mixing the components in the given amounts. Amounts are given as weight percentages based on the total weight of the ink.

TABLE 1

| Component | Function | Ink 1 | Ink 2 |
|---|---|---|---|
| 3,6,9,12-tetraoxatetradeca-1,13-diene | Reactive carrier | 28.10 | 32.74 |
| Ethoxylated trimethylolpropane triacrylate | High-functionality monomer | 60.00 | 53.00 |
| Poly[oxy(methyl-1,2-ethanediyl)],alpha,alpha,alpha-1,2,3-propanetriyltris[omega-[1-oxo-2-propen-1-yl]oxy]-and 2,6-bis(1,1-dimethylethyl)-4-(phenylenemethylene)cyclohexa-2,5-dien-1-one | Stabiliser | 0.58 | 0.50 |
| 2-hydroxy-1-[4-(2-hydroxyethoxy)phenyl]-2-methyl-1-propanone | Radical photoinitiator | 3.00 | 3.00 |
| 2-hydroxy-1-[4-(4-2-hydroxy-2-methylpropionyl)phenoxy)phenyl]-2-methylpropan-1-one | Radical photoinitiator | — | 3.50 |
| Phenyl bis(2,4,6-trimethylbenzoyl)-phosphine oxide | Radical photoinitiator | 4.00 | 4.00 |
| Copper phthalocyanine pigment | Pigment | 2.49 | 1.36 |
| Polyether-modified polydimethylsiloxane | Surfactant | 1.00 | 1.00 |
| Polyester-polyamide resin | Dispersant | 0.83 | 0.90 |
| Total | | 100.00 | 100.00 |

Example 2

The viscosity of the inks was measured using a Brookfield viscometer fitted with a thermostatically controlled cup and spindle arrangement, here a DV1 low-viscosity viscometer. The viscosity of both inks was measured as less than 30.0 mPas at 25° C.

Example 3

The inks had a low odour. The test for the suitability for indirect food packaging in terms of low migration is as follows. The inks are printed and cured onto a plastic substrate and tested for specific migration according to EU 10/2011 using food simulants. The inks of the present invention are suitable for such use.

What is claimed is:

1. A printed substrate comprising a substrate having an inkjet ink comprising:
   triethylene glycol divinyl ether;
   a tri- or higher functionality (meth)acrylate monomer in which the only radiation-curable functional groups present in the tri- or higher functionality monomer are acrylate groups; and
   a colouring agent;
   wherein the inkjet ink contains less than 5% by weight of water and volatile organic solvents in total, and less than 10% by weight of mono- and di-functional monomers in total, other than the triethylene glycol divinyl ether, where the amounts by weight are based on the total weight of the inkjet ink,
   wherein the inkjet ink has a viscosity of less than 100 mPas at 25° C., and wherein the inkjet ink further comprises a photoinitiator package comprising a blend of a bis acyl phosphine oxide photoinitiator and an alpha hydroxy ketone photoinitiator,
   wherein the inkjet ink is suitable for being printed upon food packaging material, and wherein the substrate is food packaging.

2. The printed substrate as claimed in claim 1, wherein the triethylene glycol divinyl ether and the tri- or higher functionality (meth)acrylate monomer are the only radiation-curable components present in the inkjet ink.

3. The printed substrate as claimed in any preceding claim, wherein the tri- or higher functionality (meth)acrylate monomer has a functionality of 3 to 6.

4. The printed substrate as claimed in claim 1, wherein the triethylene glycol divinyl ether is present at 10-50% by weight.

5. The printed substrate as claimed in claim 1, wherein the tri- or higher functionality (meth)acrylate monomer is present at 30-80% by weight.

6. A method of inkjet printing comprising inkjet printing the inkjet ink as recited in claim 1 onto a food packaging substrate and curing the inkjet ink.

\* \* \* \* \*